United States Patent
Welvaet et al.

(10) Patent No.: US 11,548,997 B2
(45) Date of Patent: Jan. 10, 2023

(54) METHOD FOR THE REDUCTION OF ALDEHYDE EMISSION IN POLYURETHANE FOAM

(71) Applicant: Huntsman International LLC, The Woodlands, TX (US)

(72) Inventors: Ingrid Welvaet, Heverlee (BE); Geert Lodewijk Dries, Zonhoven (BE); Joris Karel Peter Bosman, Herselt (BE)

(73) Assignee: Huntsman International LLC, The Woodlands, TX (US)

( * ) Notice: Subject to any disclaimer, the term of this patent is extended or adjusted under 35 U.S.C. 154(b) by 89 days.

(21) Appl. No.: 16/070,132

(22) PCT Filed: Feb. 6, 2017

(86) PCT No.: PCT/EP2017/052517
§ 371 (c)(1),
(2) Date: Jul. 13, 2018

(87) PCT Pub. No.: WO2017/134296
PCT Pub. Date: Aug. 10, 2017

(65) Prior Publication Data
US 2019/0023871 A1   Jan. 24, 2019

(30) Foreign Application Priority Data
Feb. 5, 2016 (EP) .................... 16154445

(51) Int. Cl.
| C08G 18/18 | (2006.01) |
| C08G 18/32 | (2006.01) |
| C08G 18/48 | (2006.01) |
| C08G 18/66 | (2006.01) |
| C08G 18/76 | (2006.01) |
| C08K 5/35 | (2006.01) |
| C08K 5/315 | (2006.01) |

(52) U.S. Cl.
CPC .......... C08K 5/315 (2013.01); C08G 18/1825 (2013.01); C08G 18/3275 (2013.01); C08G 18/4816 (2013.01); C08G 18/4841 (2013.01); C08G 18/6681 (2013.01); C08G 18/7671 (2013.01); *C08G 2110/0008* (2021.01)

(58) Field of Classification Search
CPC ... C08G 18/0838; C08J 9/0023; C08J 9/0028; C08K 5/315
See application file for complete search history.

(56) References Cited

U.S. PATENT DOCUMENTS

| 5,017,623 A * | 5/1991 | Haas ...................... C08K 5/315 |
| | | 521/128 |
| 5,373,028 A * | 12/1994 | McAfee ................. C08G 18/40 |
| | | 521/103 |
| 5,714,565 A * | 2/1998 | Nodelman ......... C08G 18/1875 |
| | | 524/770 |
| 8,293,808 B2 * | 10/2012 | Herrington ........ C08G 18/4072 |
| | | 521/109.1 |
| 2009/0326089 A1 | 12/2009 | Haas et al. |
| 2010/0099785 A1 * | 4/2010 | Rister, Jr. ........... C08G 18/3275 |
| | | 521/128 |
| 2012/0178839 A1 * | 7/2012 | Burdeniuc ............. C08G 18/16 |
| | | 521/121 |
| 2013/0197114 A1 * | 8/2013 | Burdeniuc ............ C08G 18/302 |
| | | 521/128 |
| 2016/0002426 A1 | 1/2016 | Burdeniuc et al. |
| 2016/0369035 A1 * | 12/2016 | Burdeniuc ......... C08G 18/7664 |

FOREIGN PATENT DOCUMENTS

| DE | 10003157 A | 8/2001 |
| EP | 2138520 A | 12/2009 |
| WO | 2009117479 A | 9/2009 |
| WO | 2014026802 A | 2/2014 |
| WO | 2015082316 A | 6/2015 |

OTHER PUBLICATIONS

Zerewitnoff test described by Wohler in the Journal of the American Chemical Society, vol. 49, p. 3181 (1927).

* cited by examiner

*Primary Examiner* — Melissa A Rioja
(74) *Attorney, Agent, or Firm* — Huntsman International LLC

(57) ABSTRACT

The invention is related to a method for reducing the emission of acetaldehyde and/or propionaldehyde from a polyurethane or polyurea foam, by using a reaction mixture comprising at least one isocyanate reactive component selected from the group consisting of a polyether polyol, a polyester polyol, a polyether polyamine and a polyester polyamine; an isocyanate component; and cyanoacetamide.

12 Claims, No Drawings

METHOD FOR THE REDUCTION OF ALDEHYDE EMISSION IN POLYURETHANE FOAM

The present invention is related to a method for reducing the emission of acetaldehyde or reducing the emission of formaldehyde and acetaldehyde from a polyurethane or polyurea foam.

Polyurethane and polyurea materials are well known in the art. Polyurethane and polyurea foams, in particular so-called flexible polyurethane and polyurea foams, are used in a multitude of applications.

More and more, the emission of components, such as in particular aldehyde components, is seen as a disadvantage.

Various attempts have been made to integrate so-called scavengers in the polyurethane foam. As an example DE10003157A1 discloses polymeric polyethylene imines being dissolved in a solvent, after which the solution is sucked into the foam structure. After drying or evaporation of the solvent, the polymeric molecules remain in the foam structure and act as aldehyde scavengers.

The process applying these polymers is cost and labor intensive, a significant amount of scavenging polymer is needed and the polymers are not necessarily all bonded to the chemical polyurethane or polyurea structure.

WO2009/117479 discloses a method comprising adding a primary amine containing compound to a tertiary amine catalyst and thereby reducing the quantity of formaldehyde in said tertiary amine catalyst by at least 50%. The aim of WO2009/117479 is to reduce the aldehyde formation within the catalyst and from that using the CERTIPUR standard test method to quantify the formaldehyde in foams.

Nowadays, the standards and regulations for emissions from polyurethane foam have become more stringent, especially within the automotive industry. The requirements within the automotive industry only allow very low emissions or almost no emissions of aldehydes, such as formaldehyde, from these polyurethane foams. A stringent test method is used, namely the VDA 276 test method. Patent application WO2014/026802 describes a foam where the emission of formaldehyde is decreased, when using the VDA 276 test and where the foam was made using a composition comprising an amine component. EP2 138 520 and WO 2015 082316 disclose that several compounds, such as cyanoacetamide are able to reduce the formaldehyde emission in polyurethane. However, also the emission of acetaldehyde needs to be decreased to comply with standards that are applicable in several industries.

It is therefore an object of current invention to provide a method that is able to reduce acetaldehyde emissions in a way that the properties of the polyurethane remain similar and where the composition has substantially no influence on the making of the polyurethane foam and the properties of the polyurethane foam.

It is further an object of the present invention to provide a method that is able to keep the Total VOC (TVOC) emissions low in the foams, which emissions can be measured according to the VDA 278 test.

These objects, amongst other objects, are met, at least partially, by a method according to claim 1.

One aspect of the invention is a method for reducing the emission of acetaldehyde from a polyurethane or polyurea foam, by using a reaction mixture comprising:

at least one isocyanate reactive component selected from the group consisting of a polyether polyol, a polyester polyol, a polyether polyamine and a polyester polyamine;
an isocyanate component; and
cyanoacetamide.

It has been found that cyanoacetamide is able to decrease the acetaldehyde emission and/or priopionaldehyde in polyurethane or polyurea foam. The decrease of the acetaldehyde emission due to the addition of cyanoacetamide is surprisingly, because it has been found that many compounds that are able to decrease formaldehyde emission in polyurethane are not able to decrease, but rather increase the emission of the acetaldehyde. This is e.g. shown in table 1 of WO2014/026802 where the addition of certain ethylene amines such as TEPA provided an increase of acetaldehyde, while the formaldehyde emission was sufficiently decreased. In addition, it has been found that cyanoacetamide may provide a foam wherein the TVOC emissions are low, which emissions are measured according to the VDA 278 test.

It has also been found that cyanoacetamide is able to reduce the emission of formaldehyde and acetaldehyde and/or priopionaldehyde. A second aspect of the invention is related to a method for reducing the emission of formaldehyde and acetaldehyde from a polyurethane or polyurea foam, by using a reaction mixture comprising:

at least one isocyanate reactive component selected from the group consisting of a polyether polyol, a polyester polyol, a polyether polyamine and a polyester polyamine;
an isocyanate component; and
cyanoacetamide.

According to this invention, with reducing the emission of acetaldehyde it is understood that the emission of acetaldehyde in polyurethane is reduced with at least 25%, preferably with at least 40% compared with the emission in polyurethane or polyurea foam if no cyanoacetamide is added to the reaction mixture used for making the polyurethane or polyurea foam.

According to this invention, with reducing the emission of acetaldehyde and formaldehyde it is understood that the emission of acetaldehyde in polyurethane is reduced with at least 25%, preferably with at least 40% compared with the emission in polyurethane or polyurea foam if no cyanoacetamide is added to the reaction mixture used for making the polyurethane or polyurea foam and the formaldehyde emission is reduced with at least 50%, preferably at least 75% compared with the emission in polyurethane or polyurea foam if no cyanoacetamide is added to the reaction mixture used for making the polyurethane or polyurea foam.

According to this invention, with reducing the emission of propionaldehyde, it is understood that the emission of propionaldehyde in polyurethane is reduced with at least 10%, preferably with at least 30% compared with the emission in polyurethane or polyurea foam if no cyanoacetamide is added to the reaction mixture used for making the polyurethane or polyurea foam.

The inventors surprisingly found that cyanoacetamide is able to reduce the propionaldehyde. Without being bound to a theory, it is believed that the reactivity of formaldehyde with aldehyde scavengers is different than acetaldehyde and propionaldehyde. It seems that the reactivity of acetaldehyde and priopionaldehyde with cyanoacetamide is similar. It is likely that also the emission of higher aldehydes, such as butyraldehyde, can be reduced.

Furthermore, since the acetaldehyde and propionaldehyde have a particular smell, the reduction of the emission of these compounds has as additional effect that the smell of places where polyurethane or polyurethane foams are used, such as cars and/or matrasses, is much less. The two aspects of the invention are thus also related to the reduction of smell of the polyurethane or polyurethane foam.

The polyisocyanate reactive component is selected from the group consisting of a polyether polyol, a polyester polyol, a polyether polyamine, polycarbonate polyol and a polyester polyamine.

Given as examples of the polyether polyols are polyethylene glycol, polypropylene glycol, polypropylene glycol-ethylene glycol copolymer, polytetramethylene glycol, polyhexamethylene glycol, polyheptamethylene glycol, polydecamethylene glycol, and polyether polyols obtained by ring-opening copolymerisation of alkylene oxides, such as ethylene oxide and/or propylene oxide, with isocyanate-reactive initiators of functionality 2 to 8. Preferably the polyether polyols are based on propylene oxide, optionally in combination with up to 20 wt % (based on total alkylene oxides) of ethylene oxide.

Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebacic acid, and the like can be given.

The term "isocyanate reactive component" or "polyisocyanate reactive component" as used herein includes any component with a "isocyanate reactive group(s)" or "isocyanate reactive moiety or moieties". The term "isocyanate reactive group" as use herein includes any group or moiety containing an active hydrogen group or moiety. For the purposes of this disclosure, an active hydrogen containing group refers to a group containing a hydrogen atom which, because of its position in the molecule, displays significant activity according to the Zerewitnoff test described by Wohler in the Journal of the American Chemical Society, Vol. 49, page 3181 (1927). Illustrative of such active hydrogen groups are —COOH, —OH, —NH2, and —NH.

The isocyanate component, according to this invention, is preferably a polyisocyanate and may comprise any number of polyisocyanates, including but not limited to, toluene diisocyanates (TDI), diphenylmethane diisocyanate (MDI)—type isocyanates, and prepolymers of these isocyanates.

The diphenylmethane diisocyanate (MDI) used in the present invention can be in the form of its 2,4', 2,2' and 4,4' isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, or any of their derivatives having a urethane, isocyanurate, allophonate, biuret, uretonimine, uretdione and/or iminooxadiazinedione groups and mixtures of the same.

Examples of other suitable polyisocyanates are tolylene diisocyanate (TDI), hexamethylene diisocyanate (HDI), isophorone diisocyanate (IPDI), butylene diisocyanate, trimethylhexamethylene diisocyanate, dicyclohexylmethane diisocyanate (H12MDI), di(isocyanatocyclohexyl)methane, isocyanatomethyl-1,8-octane diisocyanate and tetramethylxylene diisocyanate (TMXDI).

Semi-prepolymers and prepolymers which may be obtained by reacting polyisocyanates with compounds containing isocyanate-reactive hydrogen atoms are also isocyanate components. Examples of compounds containing isocyanate-reactive hydrogen atoms include alcohols, glycols or even relatively high molecular weight polyether polyols and polyester polyols, mercaptans, carboxylic acids, amines, urea and amides. Examples of suitable prepolymers are reaction products of polyisocyanates with monohydric or polyhydric alcohols.

The prepolymers are prepared by conventional methods, e.g. by reacting polyhydroxyl compounds which have a molecular weight of from 400 to 5000, in particular mono- or polyhydroxyl polyethers, optionally mixed with polyhydric alcohols which have a molecular weight below 400, with excess quantities of polyisocyanates, for example aliphatic, cycloaliphatic, araliphatic, aromatic or heterocyclic polyisocyanates.

The method according to the invention is used to provide polyurethane or polyurea (PU) foams such as flexible PU foam, semirigid PU foam, rigid PU foam, viscoelastic PU foam, integral skin PU foam, hydroponic PU foam and alike. In particular it is useful in PU foam applications such as mattresses, bedding foam and automotive PU foam, in particular conventional flex foam, HR flex foam, visco elastic flex foam, but also semi rigid and rigid foam.

The embodiments described below are embodiments of the first and second aspect of the invention described above.

In one embodiment of the above aspects, the amount of cyanoacetamide is from 0.01 pbw to 2 pbw, preferably from 0.05 pbw to 1.0 pbw, even more preferably between 0.05 pbw and 0.5 pbw calculated on the total weight of the reaction mixture. The amount can vary depending on the type of polyurethane that is made and the isocyanate component and the isocyanate reactive component that is used. Preferably the amount of cyanoacetamide is an effective amount that is able to reduce the emission of acetaldehyde or acetaldehyde and formaldehyde.

In another embodiment, the reaction mixture further comprises at least a catalyst selected from blowing and/or gelling catalysts, and optionally fire retardants, antioxidants, surfactants, physical or chemical blowing agents, fillers, pigments, or any other typical additives used in polyurethane materials.

In yet another embodiment, the cyanoacetamide is provided to the reaction mixture as part of the isocyanate reactive component. In this case the cyanoacetamide is first mixed with the isocyanate reactive component before the isocyanate compound is added. In yet another embodiment, the cyanoacetamide is provided to the reaction mixture as part of the isocyanate compound. In this case, the cyanoacetamide is first mixed with the isocyanate compound and is added to that isocyanate reactive compound. It has been found that for both embodiments it is possible to reduce the emission of the formaldehyde and acetaldehyde in the formed polyurethane or polyurea foam.

According to another embodiment of the invention, the reaction mixture further comprises a formaldehyde reducing agent which comprises
one or more amine components having a structure according to one of the formulae

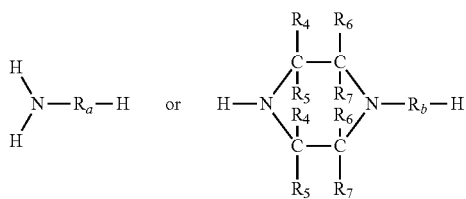

each of Ra and Rb independently being a random sequence of units R1, R2 and/or R3, for which
R1 being

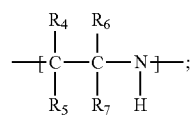

R2 being

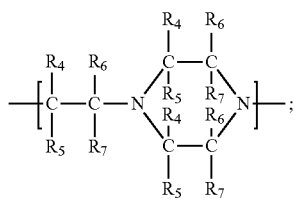

R3 being

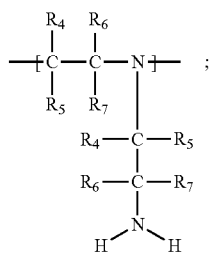

each of said R4, R5, R6 and R7 individually are —H or —CH$_3$;
wherein Ra comprises 3 to 17 nitrogen atoms, Rb comprises 2 to 16 nitrogen atoms.

With random sequence of units R1, R2 and/or R3 is meant that the amine component can have a sequence of R1, R2 and/or R3 wherein each of the formulas R1, R2 and/or R3 appears several times in the amine component, and wherein the amine component may comprise at least one of the formula R1, R2 or R3 or a combination of R1, R2, and/or R3. The sequence of units of R1, R2 or R3 in the amine component is preferably between 1-10 times, more preferably between 1-5 times. In one embodiment, the amine component comprises a sequence of units R1, R2 or R3. In another embodiment, the amine component comprises a sequence of units of R1 and R2, R1 and R3 or R2 and R3.

According to some embodiments, the average number of nitrogen atoms of said one or more amine components is in the range of 5 to 10.

The average number of nitrogen atoms is calculated according to the following definition:

$$F = \Sigma Vi^*(fi)^2 / \Sigma Vi^* fi, \text{ wherein}$$

Vi=volume fraction of component i;
fi=nitrogen atoms in component i.

According to some embodiments, the average number of nitrogen atoms of said one or more amine components may be in the range 5 to 8.

A typical average is between 6.5 and 7.5, e.g. about 7.

One or more amine components may comprise at least two, and preferably more than two amines according to said formulae. This may add up to 10 or more different amines, all having a structure according to one of said formulae. These at least two, and preferably more than two amines may be referred to as amine mixture.

In yet another embodiment the reaction mixture further comprises a treating agent selected from the group consisting of a cyclic urea substituted with at least one isocyanate reactive group, a free radical scavenger, a polymer acid, wherein the polymer acid contains at least three of the same repeating monomers, of either an unsaturated carboxylic acid or an anhydride; or wherein the polymer acid contains at least two repeating monomers, wherein the first monomer is an unsaturated carboxylic acid or an anhydride, and the second monomer is different from the first monomer or a mixture thereof.

It was found that of the one or more amine components with formulae as set out above, and cyanoacetamide, preferably together with a treating agent for making PU foam by reacting an isocyanate reactive composition, with a polyisocyanate component, these compounds act as a scavenger for formaldehyde and acetaldehyde and/or propionaldehyde. The one or more amine components with formulae as set out above itself can easily be included in the chemical structure of the polyurethane, as the primary and secondary amines are significantly reactive to the isocyanate groups of the polyisocyanate. As such the one or more amine components with formulae set out above are bond in the foam, while they influence little or even not the chemical and physical properties of the foam, seen its low molecular weight and the little amount that might be used.

According to preferred embodiments, the one or more amine components with formulae as set out above have at least one primary amine group and at least one secondary amine group. More preferable the one or more amine components has at least one component which has at least two primary amine groups and at least one secondary amine group According to alternative embodiments, the one or more amine components with formulae as set out above have at least two secondary amine groups.

In preferred embodiments, the amount of the one or more amine components in the composition is between 0.01% w to 2.5% w calculated on the total weight of the composition.

More preferably, the amount of the one or more amine components all together may provide 0.05% w to 1% w, 0.1 to 1% w or even 0.2 to 0.7% w of said composition according to the invention.

According to some embodiments, all R4-, R5-, R6- and R7-groups in the amine component may be hydrogen. As such a composition is provided, which composition comprises at least one component selected from the group consisting of a polyether polyol, a polyester polyol, a polyether polyamine and a polyester polyamine;
one or more amine components, each of said amine components having a structure according to one of the formulae

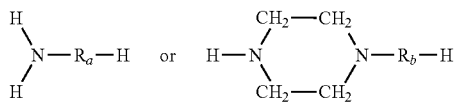

wherein each of Ra and Rb independently being a random sequence of units $R^1$, $R^2$ and/or $R^3$, for which $R^1$ is

$R^2$ is

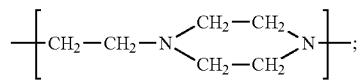

$R^3$ is

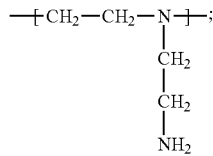

wherein Ra comprises 3 to 17 nitrogen atoms and Rb comprises 2 to 16 nitrogen atoms.

The amount of the one or more amine components in the composition is between 0.05 wt % to 1.0 wt % calculated on the total weight of the composition.

According to some embodiments, the one or more amine components may be a mixture comprising triethylene tetramines (TETA) and/or tetraethylene pentamines (TEPA) and/or pentaethylene hexamines (PEHA) and/or hexaethylene heptamines (HEHA) and/or heptaethylene octamines (HEOA) and/or octaethylene nonamines (OENO) and/or higher polyethylene amines. This mixture typically further comprises amine components with in total 9 to 18 nitrogen atoms in its structure. The mixture may be obtained by reacting ethylene dichloride (EDC) with ammonia at elevated pressure and temperatures. This mixture is than neutralized with caustic after which a distillation can separate the various amine components from the mixture. As a person skilled in the art knows, TETA, TEPA, PEHA, HEHA, HEOA, and OENA each comprise a mixture of ethylene amines with close boiling points. For example, TEPA comprises besides N-(2-aminoethyl)-N'-{2-{(2-aminoethyl)amino}ethyl}-1,2-ethanediamine), also AETETA (4-(2-aminoethyl)-N-(2-aminoethyl)-N'-{2-{(2-aminoethyl)amino}ethyl}-1,2-ethanediamine), APEEDA (1-(2-aminoethyl)-4-[(2-aminoethyl)amino]ethyl]-piperazine) and PEDETA (1-[2-[[2-[(2-aminoethyl)amino]ethyl]-amino]ethyl]-piperazine). As another example, TETA may comprise a mixture of TETA (N,N'-bis (2-aminoethyl)-1,2-ethanediamine), Bis AEP (N,N'-bis-(2-aminoethyl)piperazine), PEEDA (N-[(2-aminoethyl)2-aminoethyl]piperazine) Branched TETA (tris-(2-aminoethyl)amine).

According to some embodiments, the one or more amine components may be triethylene tetramines (TETA) and/or tetraethylene pentamines (TEPA). In these embodiments, and in particular where only triethylene tetramines (TETA) or only tetraethylene pentamines (TEPA) are included in the composition according to the invention, the one amine components may provide 0.1 to 1% w or even 0.2 to 0.7% w of said composition according to the invention. Also this embodiment may further comprise amine components with in total 9 to 18 nitrogen atoms in its structure.

The composition according to the invention has the further advantage that it is provided as a liquid under ambient conditions, facilitating the addition of this composition into a reactive mixture suitable to provide polyurethane or polyurea foam.

In one embodiment the cyclic urea contains at least one isocyanate reactive group and has the formula (I) or (II):

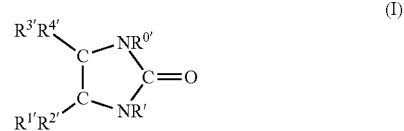

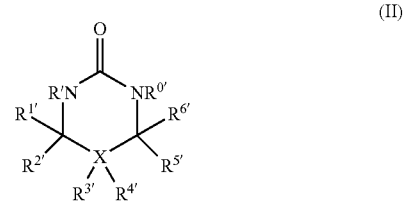

where R', $R^{0'}$, $R^{1'}$, $R^{2'}$, $R^{3'}$, $R^{4'}$, $R^{5'}$ and $R^{6'}$ are independently selected from H, OH, $R^{11'}$OH, NH or COOH, and $R^{11'}$ is a $C_1$-$C_4$ alkyl group, X is C, O or N with the proviso that when X is O, $R^{3'}$ and $R^{4'}$ are each zero and when X is N, one of $R^{3'}$ or $R^{4'}$ is zero, and further with the proviso at least one of R' or $R^{0'}$ is H and that at least: one of $R^{0'}$, $R^{1'}$, $R^{2'}$, $R^{3'}$, $R^{4'}$, $R^{5'}$, $R^{6'}$ is OH, COOH, $R^{11'}$OH, or NH; or $R^{1'}R^{2'}$ or $R^{5'}R^{6'}$ are $NH_2$.

In yet another embodiment, the cyclic urea containing at least one isocyanate reactive group added to the reaction mixture is selected from the group consisting of 4,5-dihydroxy-2-imidazolidinone, 4,5-dimethoxy-2-imidazolidinone, 4-hydroxyethyl ethylene urea, 4-hydroxy-5-methyl propylene urea, 4-methoxy-5-methyl propylene urea, 4-hydroxy-5,5-dimethyl propylene urea, 1-(2-hydroxyethyl)-2-imidazolidinone or a mixture thereof.

In yet another embodiment, the free radical scavenger comprises a sterically hindered phenol having the formula (III):

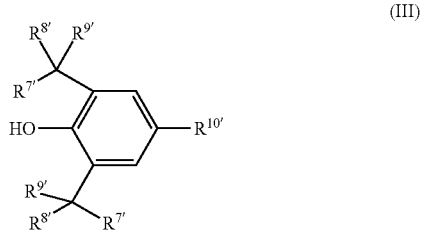

(III)

wherein $R^{7'}$, $R^{8'}$ and $R^{9'}$ are independently selected from H or a $C_1$-$C_{10}$ alkyl group, preferably wherein $R^{7'}$, $R^{8'}$ and $R^{9'}$ are independently selected from H or a $CH_3$ group and $R^{10'}$ is H or a $C_1$-$C_{12}$ alkyl group, preferably $R^{10'}$ is H or a $C_1$-$C_4$ alkyl group.

In yet another embodiment the free radical scavenger is a phosphite.

In yet another embodiment, the one or more amine components that is added to the reaction mixture is triethyltetramines (TETA), tetraethyl pentamines (TEPA), pentaethylhexamines (PEHA), hexaethylheptamines (HEHA), heptaethyloctamines (HEOA) and/or octaethylenenonamines (OENO), or a mixture thereof.

As described the composition according to the invention may further comprise a treating agent. The treating agent can be a cyclic urea substituted with at least one isocyanate reactive group. The treating agent can also be a free radical scavenger. The treating agent can also be a polymer acid. The treating agent can be a mixture of a cyclic urea substituted with at least one isocyanate reactive group and a free radical scavenger. The treating agent can be the polymer acid alone, or a mixture of the polymer acid and the free radical scavenger or the cyclic urea, or a mixture of the polymer acid, the free radical scavenger and the cyclic urea.

According to one particular embodiment, the treating agent is a cyclic urea substituted with at least one isocyanate reactive group. The cyclic urea may be a cycloaliphatic or bicycloaliphatic compound having an element of the structure —NH—CO—NH— within a ring structure. In one embodiment, the cyclic urea has a total number of ring atoms ranging from 5 to 7. Such cyclic urea is substituted with at least one isocyanate reactive group on either the —N or —C atoms or both. In one particular embodiment, the cyclic urea substituted with at least one isocyanate reactive group has the formula (I):

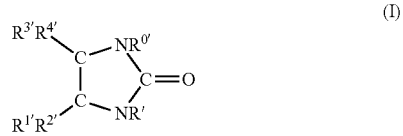

(I)

where R', $R^{0'}$, $R^{1'}$, $R^{2'}$, $R^{3'}$, and $R^{4'}$ are independently selected from H, OH, $R^{11'}$OH, NH or COOH, and
$R^{11'}$ is a $C_1$-$C_4$ alkyl group,
with the proviso that at least one of R' or $R^{0'}$ is H, and further with the proviso that at least: one of R', $R^{0'}$, $R^{1'}$, $R^{2'}$, $R^{3'}$, and $R^{4'}$ is OH, COOH, $R^{11'}$OH, or NH; or $R^{1'}R^{2'}$ or $R^{3'}R^{4'}$ is $NH_2$.

Examples of such compounds of formula (I) include, but are not limited to, 4,5-dihydroxy-2-imidazolidinone, 4,5-dimethoxy-2-imidazolidinone, 4-hydroxyethyl ethylene urea, 4-hydroxy-5-methyl propylene urea, 4-methoxy-5-methyl propylene urea, 4-hydroxy-5,5-dimethyl propylene urea, 1-(2-hydroxyethyl)-2-imidazolidinone or a mixture thereof. According to another embodiment, the treating agent is a cyclic urea substituted with at least isocyanate reactive group having the formula (II):

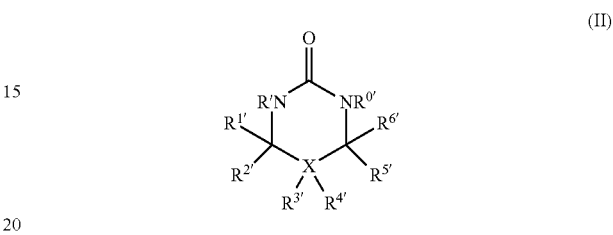

(II)

where R', $R^{0'}$, $R^{1'}$, $R^{2'}$, $R^{3'}$, $R^{4'}$, $R^{5'}$ and $R^{6'}$ are independently selected from H, OH, $R^{11'}$OH, NH or COOH, and
$R^{11'}$ is a $C_1$-$C_4$ alkyl group,
X is C, O or N with the proviso that when X is O, $R^{3'}$ and $R^{4'}$ are each zero and when X is N, one of $R^{3'}$ or $R^{4'}$ is zero,
and further with the proviso at least one of R' or $R^{0'}$ is H and that at least: one of $R^{0'}$, $R^{1'}$, $R^{2'}$, $R^{3'}$, $R^{4'}$, $R^{5'}$, $R^{6'}$ is OH, COOH, $R^{11'}$OH, or NH; or $R^{1'}R^{2'}$ or $R^{5'}R^{6'}$ are $NH_2$.

Examples of such compounds of formula (II) include, but are not limited to, tetrahydro-5-(2-hydroxyethyl)-1,3,5-triazin-2-one, tetrahydro-5-(ethyl)-1,3,5-triazin-2-one, tetrahydro-5-(propyl)-1,3,5-triazin-2-one, tetrahydro-5-(butyl)-1,3,5-triazin-2-one or mixtures thereof.

According to another embodiment, the treating agent is a free radical scavenger. The free radical scavenger includes compounds such as, but not limited to, methimazole, phenyl methimazole, and derivatives thereof allupurinol, propyl thiouracil, glutamine, diaminobenzylamine; nicotinamide; hindered phenols or hindered aliphatic or aromatic amines; phosphites; ditridecylthiodipropionate; and natural antioxidants such as Vitamin C, Vitamin E and/or glutathione. Especially preferred free radical scavengers are methimazole, sterically hindered phenols, sterically hindered aromatic amines, or phosphites.

According to one embodiment, the free radical scavenger is a hindered phenol. In another embodiment, the hindered phenol is a sterically hindered phenol. The term "sterically hindered phenol" as used herein means that the phenol in positions 2 and 6 of the aromatic ring has substituents which, on the basis of their three-dimensional size, shield the OH group of the phenolic ring and result in an attenuated reactivity. Thus, in one particular embodiment, the sterically hindered phenol is a compound having the formula (III):

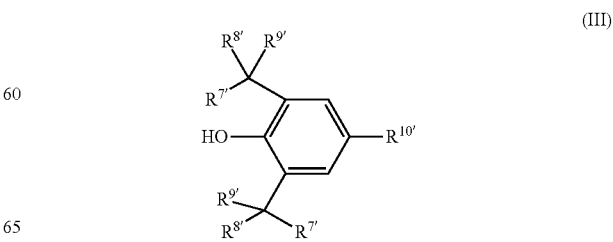

(III)

where $R^{7'}$, $R^{8'}$ and $R^{9'}$ are independently selected from H or a $C_1$-$C_{10}$ alkyl group and $R^{10'}$ is H or a $C_1$-$C_{12}$ alkyl group.

In one embodiment, $R^{7'}$, $R^{8'}$ and $R^{9'}$ are independently selected from H or a $CH_3$ group and $R^{10'}$ is H or a $C_1$-$C_4$ alkyl group. In still another embodiment, $R^{7'}$, $R^{8'}$ and $R^{9'}$ are each a $CH_3$ group and $R^{10'}$ is H, a methyl group, an ethyl group, a propyl group or an isopropyl group.

Examples of such compounds having formula (III), include, but are not limited to, 2,6-di-t-butyl-4-methyl phenol, 2,6-di-t-butyl-4-isopropyl phenol, 2,6-di-t-butyl-4-ethyl phenol, 2,4-dimethyl-6-octyl phenol, 2,6-di-t-butyl-4-n-butyl phenol and 2,4-dimethyl-6-t-butyl phenol, 3,5-bis(1,1-dimethyl ethyl)-4-hydroxy-benzenepropanoic acid branched C13-15 alkyl esters.

In another embodiment, the free radical scavenger is a phosphite. Examples of phosphites include, but are not limited to, triphenyl phosphite, trisnonlyphenyl phosphite, tris(p-cresyl) phosphite, triethyl phosphite, tris(2-ethylhexyl) phosphite, tridecyl phosphite, trilauryl phosphite, tris(tridecyl) phosphite, trioleyl phosphite, tris(dipropylene glycol) phosphite, diphenyl mono(2ethylhexyl) phosphite, diphenyl monodecyl phosphite, diphenyl mono(tridecyl) phosphite, trilauryl trithiophosphite, diisodecyl(phenyl) phosphite, diethyl hydrogen phosphite, bis(2-ethylhexyl) hydrogen phosphite; dilauryl hydrogen phosphite, dioleyl hydrogen phosphite, diphenyl hydrogen phosphite, tetraphenyl dipropyleneglycol diphosphite, tetraphenyl tetra(tridecyl) pentaerythritol tetraphosphite/bis(2-ethylhexyl) phthalate, tetra($C_{12}$-$C_{15}$ alkyl)-4,4'-isopropylidene diphenyl diphosphite, bis(tridecyl)pentaerythritol diphosphite/bis (nonylphenyl) pentaerythritol diphosphite, bis(decyl) pentaerythritol diphosphite, bis(tridecyl) pentaerythritol diphosphite, tristearyl phosphite, distearyl pentaerythritol diphosphite, tris(2,4-di-tert-butylphenyl) phosphite, hydrogenated bisphenol A pentaerythritol phosphite polymer, hydrogenated bisphenol A phosphite polymer, and mixtures thereof.

In another embodiment, the free radical scavenger is a sterically hindered amine. According to this invention a "sterically hindered amine" is a secondary amine having two substituted phenyl groups which, on the basis of their three-dimensional size, shield the amine group and result in an attenuated reactivity.

In one particular embodiment, the sterically hindered amine, is a substituted diphenyl amine aromatic amine compound having the formula (IV):

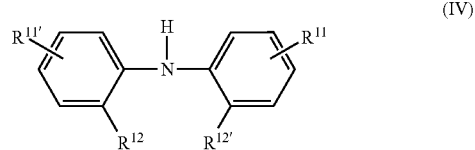

(IV)

wherein R11 and R11' are independently selected from H or a C1-C12 alkyl or aryl group and R12 and R12' are H or a C1-C4 alkyl group in case R11 or R11' are not positioned at that place.

Examples of hindered aromatic amines are 4,4'-bis(α,α-dimethylbenzyl)diphenylamine; benzenamine,4-octyl-N-(4-octylphenyl); Benzenamine,4-(1-methyl-1-phenlyethyl)-N-4[4-91-methyl-1-phenylethyle]phenyl]; Benzeneamine, ar-nonyl-N-nonylphenyl; Benzenamine, N-phenyl-reaction products with 2,4,4-trimethylpentene; Benzenamine, N-phenyl-,styrenated; Benzenamine, 2-ethyl-N-(2-ethylphenyl)-(tripropenyl) derivatives.

In yet another embodiment, the treating agent is a mixture of the cyclic urea substituted with at least one isocyanate reactive group described above and sterically hindered phenol described above.

In still another embodiment, the treating agent is a mixture of the cyclic urea substituted with at least one isocyanate reactive group described above and a phosphite described above.

In still another preferred embodiment, the treating agent is a "polymer acid". For the purpose of this disclosure, "polymer acid" is defined in two ways. First, the "polymer acid" is any material containing three or more of the same repeating monomers of either an unsaturated carboxylic acid or an anhydride. Second, the "polymer acid" is any material containing at least two repeating monomers, wherein the first monomer is either an unsaturated carboxylic acid or an anhydride, and the second monomer is different from the first monomer. Thus, in an embodiment where the first monomer is an unsaturated carboxylic acid, the second monomer may be a different unsaturated carboxylic acid, an anhydride, or an alternative monomer.

Alternatively, in an embodiment where the first monomer is an anhydride, the second monomer may be an unsaturated carboxylic acid, a different anhydride or an alternative monomer. In one embodiment, the alternative monomer to the unsaturated carboxylic acid and anhydride is a vinyl monomer, such as, but not limited to, styrene, ethylene, propylene, butylene, acrylonitrile, and vinyl chloride.

The unsaturated carboxylic acid and anhydride of the polymer acid may be any acid containing at least one double bond, which is capable of being polymerized with either itself or another acid or anhydride monomer, or any non-acid containing monomer. Examples of unsaturated carboxylic acids and anhydrides include, but are not limited to, acrylic acid, methacrylic acid, maleic acid, maleic anhydride, succinic acid, succinic anhydride, furoic acid, fumaric acid, sorbic acid, tiglic acid, linoleic acid, linolenic acid, licanic acid, and other acids containing double bonds which are capable of reacting with ethylenic unsaturated monomers or dimers.

In one embodiment, the polymer acid contains at least three or more of the same repeating monomers selected from the group consisting of acrylic acid, methacrylic acid, maleic acid, maleic anhydride, furoic acid, fumaric acid, sorbic acid, tiglic acid, linoleic acid, linolenic aid and licanic acid.

In another embodiment, the polymer acid contains at least two repeating monomers where the first monomer is an unsaturated carboxylic acid and the second monomer is a different unsaturated carboxylic acid, an anhydride or an alternative monomer. In one particular embodiment, the unsaturated carboxylic acid may be selected from the group consisting of acrylic acid, methacrylic acid, maleic acid, furoic acid, fumaric acid, sorbic acid, tiglic acid, linoleic acid, linolenic aid and licanic acid. In yet another embodiment, the anhydride and the alternative monomer when present may be selected from the group consisting of maleic anhydride, styrene, ethylene, propylene, butylene, acrylonitrile and vinyl chloride.

In still another embodiment, the polymer acid contains at least two repeating monomers where the first monomer is an anhydride and the second monomer is a different anhydride, an unsaturated carboxylic acid or an alternative monomer. In one particular embodiment, the anhydride may be maleic anhydride. In another embodiment, the unsaturated carboxylic acid or alternative monomer when present may be selected from the group consisting of acrylic acid, methacrylic acid, maleic acid, furoic acid, fumaric acid, sorbic acid, tiglic acid, linoleic acid, linolenic aid, licanic acid, styrene, ethylene, propylene, butylene, acrylonitrile and vinyl chloride.

The addition of the polymer acid to the composition according to the invention has as advantage that the foam made from the composition can be more homogenous and stable compared when no polymer acid is added to the composition. This is because the reactivity of the amine in the composition is reduced by the polymer acid.

In yet another embodiment the reaction mixture further comprises a formaldehyde reducing agent which comprises a CH-acidic compound of the formula $R^1$—$CH_2$—$R^2$, wherein $R^1$ and $R^2$ independently represent an electron-withdrawing radical of the formula —C(O)—$R^3$ or —CN, wherein $R^3$ is selected from the group consisting of —$NH_2$, —NH—$R^4$, —$NR^5R^6$, $OR^7$ or $R^8$, wherein $R^4$, $R^5$, $R^6$, $R^7$ and $R^8$ are independently selected from the group consisting of aliphatic, araliphatic or aromatic hydrocarbons which may be substituted with one or more isocyanate-reactive groups.

The inventors found that when using the formaldehyde reducing agent in combination with cyanoacetamide for making polyurethane and polyurethane foam, both the formaldehyde and the acetaldehyde emission reduced significantly. Also a combination of cyanoacetamide and a formaldehyde reducing agent which comprises a CH-acidic compound and an amine component together with a treating agent seems to reduce the formaldehyde emission even more.

In one embodiment, the radicals $R^4$, $R^5$, $R^6$, $R^7$ and $R^8$ of the CH-acidic compound are each independently selected from the group consisting of aliphatic hydrocarbons having 1 to 15 carbon atoms, which may be substituted.

In yet another embodiment, $R^4$, $R^5$, $R^6$, $R^7$ and $R^8$ are independently selected from the group consisting of aliphatic, araliphatic or aromatic hydrocarbons which are substituted with one or more isocyanate-reactive groups selected from —OH, —NH— or —$NH_2$ groups.

The above and other characteristics, features and advantages of the present invention will become apparent from the following detailed description which illustrates, by way of example, the principles of the invention. This description is given for the sake of example only, without limiting the scope of the invention.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could.

Furthermore, the particular features or characteristics may be combined in any suitable manner in one or more embodiments, as would be apparent to one of ordinary skill in the art.

In the context of the present invention the following terms have the following meaning:

1) Unless otherwise indicated, reference to % w, w %, wt % or percentage by weight of a given component refers to the weight of said component, expressed as percentage, over the total weight of the composition in which said component is present at that moment in time.

2) The VDA 276 test method (also called VOC chamber test) is an emission measurement method to measure the emissions from a foam sample done in a 1 $m^3$ chamber where the foam is exposed to 65° C. and 5% RH (relative humidity) for several hours. VDA 276 (Verband Der Automobil industrie) is a specific automotive emission method used by a host of automotive OEM's (original equipment manufacturers) to specify the permissible emission levels coming from automotive interior parts.

3) isocyanate index or NCO index or index: the ratio of NCO-groups over isocyanate-reactive hydrogen atoms present in a formulation, given as a percentage:

In other words the NCO-index expresses the percentage of isocyanate actually used in a formulation with respect to the amount of isocyanate theoretically required for reacting with the amount of isocyanate-reactive hydrogen used in a formulation.

EXAMPLE 1

The following table 1 and 2 show the PU formulations used (table 1) and results of the VDA-276 test (Table 2). To the polyol formulation the polyisocyanate compound Suprasec 2447 (from Huntsman) is added at an index of 80 to make the polyurea foam. For each formulation about 1 kg foam was made via hand mix foam procedure for the VDA-276 emission test (air sampling after 4 h, at 65° C./5% Rel humidity and 0.4 EA/hour).

It is indicated how much of the aldehyde scavenger is added. Cyanoacetamide is able to reduce the acetaldehyde. Further, it is shown a combination of cyanoacetamide with an ethylene amine and a polymeric acid reduces the emission of formaldehyde and acetaldehyde. Also the propionaldehyde emission is reduced when using a combination of cyanoacetamide with an ethylene amine and a polymeric acid.

TABLE 1

Polyol formulation. All the components are available from Huntsman International LLC except for Tegostab B 8734 LF-2 which is available from Evonik and Cyanoacetamide available from Sigma Aldrich.

|  | REF 1* | REF 2 | Exp 1 | Exp 2 | Exp 3 | Exp 4 |
|---|---|---|---|---|---|---|
| Daltocel F 428 (wt % in view of polyol formulation) | 90 | 90 | 89.8 | 89.85 | 89.75 | 89.5 |
| Daltocel F526 (wt % in view of polyol formulation) | 4 | 4 | 4 | 4 | 4 | 4 |
| DELA (wt % in view of polyol formulation) | 0.25 | 0.25 | 0.25 | 0.25 | 0.25 | 0.25 |
| Tegostab B 8734 LF-2 (wt % in view of polyol formulation) | 0.9 | 0.9 | 0.9 | 0.9 | 0.9 | 0.9 |
| Water (wt % in view of polyol formulation) | 3.7 | 3.7 | 3.7 | 3.7 | 3.7 | 3.7 |
| JEFFCAT LED-103 (wt % in view of polyol formulation) | 0.15 | 0.15 | 0.15 | 0.15 | 0.15 | 0.15 |
| JEFFCAT DPA (wt % in view of polyol formulation) | 1 | 1 | 1 | 1 | 1 | 1 |
| Acetaldehyde content added in polyol (ppm)** |  | 1.5 | 1.5 | 1.5 | 1.5 | 1.5 |
| TEPA in wt % (available from Huntsman) |  |  | 0.2 |  | 0.17 | 0.34 |
| Polyacrylic acid Mw 5000 in wt % |  |  | 0.1 |  | 0.08 | 0.17 |
| Cyanoacetamide in wt % |  |  |  | 0.15 | 0.075 | 0.15 |

TABLE 2

Results of VDA-276 chamber emission.

| VDA276 aldehyde emissions from foam (in µg/m³/kg foam) | REF 1 | REF 2 | Exp 1 | Exp 2 | Exp 3 | Exp 4 |
|---|---|---|---|---|---|---|
| Formaldehyde | 224 | 231 | 9 | 25 | 4 | 1 |
| Acetaldehyde | 33 | 154 | 178 | 88 | 108 | 84 |
| Propionaldehyde | 407 | 454 | 502 | 302 | 265 | 244 |
| Total aldehydes | 664 | 839 | 689 | 415 | 377 | 329 |

\* In REF 1 there is no extra acetaldehyde added to the polyol composition.

\*\*The acetaldehyde is added by mixing the polyol with 4.2 parts of polyol to which 36.4 ppm acetaldehyde was added.

EXAMPLE 2

The following formulation was used to make polyurethane foam.

TABLE 3

Polyol formulation.

| Daltocel F428 (wt % in view of the polyol formulation) | 94 |
|---|---|
| Water (wt % in view of the polyol formulation) | 3.8 |
| Jeffcat ZF10 (wt % in view of the polyol formulation) | 0.1 |
| Jeffcat DPA (wt % in view of the polyol formulation) | 1 |
| Diethanolamine (wt % in view of the polyol formulation) | 0.2 |
| Tegostab B8734LF2 (wt % in view of the polyol formulation) | 0.9 |
| Subtotal of polyol formulation | 100 |

To this formulation, Isocyanate (pure MDI 2,4' MDI/4,4' MDI: 50/50/Suprasec 2185: 80/20) (in pbw) is added at an index of 91 to make the polyurethane foam. For each formulation about 1 kg foam was made via hand mix foam procedure for the VDA-276 emission test (air sampling after 4 h, at 65° C./5% Rel humidity and 0.4 EA/hour). The following tables show the results of the VDA-276 test of the above described foam. It is indicated how much of the aldehyde scavengers are added. All the aldehyde scavengers were first added to the polyol formulation and then the isocyanate is added.

TABLE 4

Example not according to the invention. Addition of formaldehyde scavenger 2-cyano-N-methyl-acetamide.

|  | REF 3 | Exp 5 |
|---|---|---|
| Acetaldehyde added to polyol (ppm) | 0.8 | 0.8 |
| 2-cyano-N-methyl-acetamide (wt %) |  | 0.25 |
| VDA276 aldehyde emissions from foam (in µg/m³/kg foam) |  |  |
| Formaldehyde | 162 | 63 |
| Acetaldehyde | 54 | 55 |
| Propionaldehyde | 182 | 198 |

TABLE 5

Example not according to the invention. Addition of formaldehyde scavenger ethyl cyanoacetate

|  | REF 4 | Exp 6 |
|---|---|---|
| Acetaldehyde added to polyol (ppm) | 0.8 | 0.8 |
| Ethyl cyanoacetate (wt %) |  | 0.25 |
| VDA276 aldehyde emissions from foam (in µg/m³/kg foam) |  |  |
| Formaldehyde | 153 | 56 |
| Acetaldehyde | 43 | 58 |
| Propionaldehyde | 187 | 212 |

Exp 5 and 6 show that the scavenging of formaldehyde does not mean that acetaldehyde and propionaldehyde are scavenged. Indeed, ethyl cyanoacetate and 2-cyano-N-methyl-acetamide are able to reduce the emission of formaldehyde, but do not have an effect on the emission of acetaldehyde and propionaldehyde. This suggests that the mechanism of scavenging of these 3 different aldehydes is different.

The invention claimed is:

1. A method for reducing the emission of acetaldehyde and/or propionaldehyde from a polyurethane or polyurea foam, the method comprising: forming a reaction mixture by mixing
   (i) at least one isocyanate reactive component selected from the group consisting of a polyether polyol, a polyester polyol, a polyether polyamine and a polyester polyamine, or combinations thereof, with
   (ii) an isocyanate component,
   (iii) a cyanoacetamide (iv) a treating agent selected from the group consisting of a cyclic urea substituted with at least one isocyanate reactive group, a polymer acid and a mixture thereof wherein the polymer acid contains at least three of the same repeating monomers, of either an unsaturated carboxylic acid or an anhydride; or wherein the polymer acid contains at least two repeating monomers, wherein said at least two types of repeating monomers includes a first type of repeating monomer which is an unsaturated carboxylic acid or an anhydride, and a second type of repeating monomer which is different from the first type of repeating monomer; and
wherein the amount of cyanoacetamide is from 0.075 parts by weight to 2.0 parts by weight, based on 100 parts by weight of the reaction mixture; and wherein the reaction mixture further comprises a formaldehyde reducing agent which comprises a CH-acidic compound of the formula $R^1$—$CH_2$—$R^2$, wherein Wand $R^2$ represent an electron-withdrawing radical of the formula —C(O)—$R^3$, wherein $R^3$ is selected from the group consisting of —NH—$R^4$, —$NR^5R^6$, $OR^7$ and $R^8$, wherein $R^4$, $R^5$, $R^6$, $R^7$ and $R^8$ are independently selected from the group consisting of aliphatic, araliphatic and aromatic hydrocarbons which are substituted with one or more isocyanate-reactive groups.

2. A method for reducing the emission of formaldehyde, acetaldehyde, and propionaldehyde from a polyurethane or polyurea foam, the method comprising: forming a reaction mixture by mixing
   (i) at least one isocyanate reactive component selected from the group consisting of a polyether polyol, a polyester polyol, a polyether polyamine and a polyester polyamine, or combinations thereof, with
   (ii) an isocyanate component,
   (iii) a cyanoacetamide, and
   (iv) a treating agent selected from the group consisting of a cyclic urea substituted with at least one isocyanate reactive group, a polymer acid and a mixture thereof wherein the polymer acid contains at least three of the same repeating monomers, of either an unsaturated carboxylic acid or an anhydride; or wherein the polymer acid contains at least two repeating monomers, wherein said at least two types of repeating monomers includes a first type of repeating which is an unsaturated carboxylic acid or an anhydride, and a second type of repeating monomer which is different from the first type of repeating monomer; wherein the amount of cyanoacetamide is from 0.075 parts by weight to 2.0 parts by weight, based on 100 parts by weight of the reaction mixture;
wherein the acetaldehyde emission of the polyurethane or polyurea foam is at least 25% less and the formaldehyde emission of the polyurethane or polyurea foam is at least 50% less than polyurethane or polyurea foam prepared from a mixture identical to the reaction mixture but not comprising the cyanoacetamide; and wherein the reaction mixture further comprises a formaldehyde reducing agent which comprises a CH-acidic compound of the formula $R^1$—$CH_2$—$R^2$, wherein $R^1$ and $R^2$ represent an electron-withdrawing radical of the formula —C(O)—$R^3$, wherein $R^3$ is selected from the group consisting of —NH—$R^4$, —$NR^5R^6$, $OR^7$ and $R^8$, wherein $R^4$, $R^5$, $R^6$, $R^7$ and $R^8$ are independently selected from the group consisting of aliphatic, araliphatic and aromatic hydrocarbons which are substituted with one or more isocyanate-reactive groups.

3. The method according to claim 1, wherein said reaction mixture further comprises at least a catalyst selected from blowing and/or gelling catalysts, and optionally fire retardants, antioxidants, surfactants, physical blowing agents, chemical blowing agents, fillers, or pigments.

4. The method according to claim 1, wherein the cyanoacetamide and the at least one isocyanate reactive component are combined prior to mixing with the isocyanate component.

5. The method according to claim 1, wherein the reaction mixture further comprises the formaldehyde reducing agent further comprises:
one or more amine components having a structure according to one of the formulae

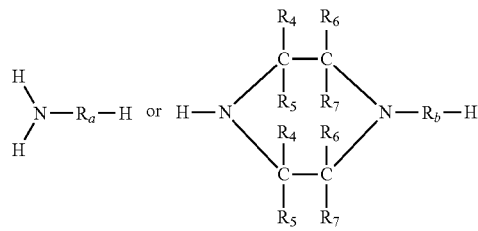

each of $R_a$ and $R_b$ independently being a random sequence of units $R_1$, $R_2$ and/or $R_3$
wherein $R_1$ is

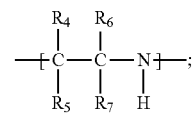

$R_2$ is

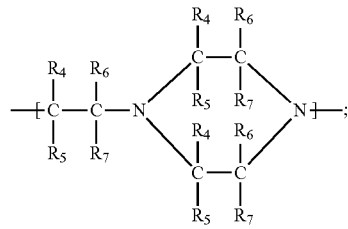

$R_3$ is

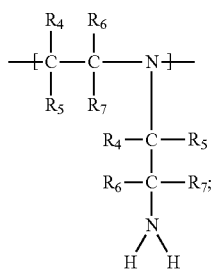

and each of said $R_4$, $R_5$, $R_6$ and $R_7$ individually are —H or —$CH_3$;
and wherein $R_a$ comprises 3 to 17 nitrogen atoms, and $R_b$ comprises 2 to 16 nitrogen atoms.

6. The method according to claim 1, wherein the cyclic urea containing at least one isocyanate reactive group has the formula (I) or (II):

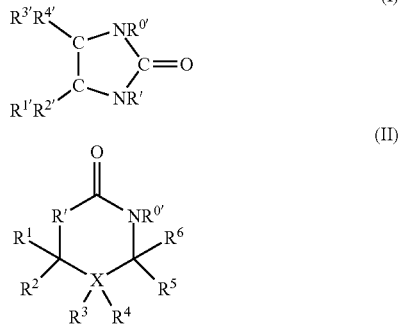

(I)

(II)

where R', R$^{0'}$, R$^{1'}$, R$^{2'}$, R$^{3'}$, R$^{4'}$, R$^{5'}$ and R$^{6'}$ are independently selected from H, OH, R$^{11'}$ OH, NH and COOH, and R$^{11'}$ is a C$_1$-C$_4$ alkyl group, X is C, O or N with the proviso that when X is O, R$^{3'}$ and R$^{4'}$ are each zero and when X is N, one of R$^{3'}$ or R$^{4'}$ is zero, and further with the proviso at least one of R' or R$^{0'}$ is H and that at least: one of R$^{0'}$, R$^{1'}$, R$^{2'}$, R$^{3'}$, R$^{4'}$, R$^{5'}$, R$^{6'}$ is OH, COOH, R$^{11'}$OH, or NH; or R$^{1'}$R$^{2'}$ or R$^{5'}$R$^{6'}$ are NH$_2$.

7. The method according to claim 1, wherein the cyclic urea containing at least one isocyanate reactive group is selected from the group consisting of 4,5-dihydroxy-2-imidazolidinone, 4,5-dimethoxy-2-imidazolidinone, 4-hydroxyethyl ethylene urea, 4-hydroxy-5-methyl propylene urea, 4-methoxy-5-methyl propylene urea, 4-hydroxy-5,5-dimethyl propylene urea, 1-(2-hydroxyethyl)-2-imidazolidinone and a mixture thereof.

8. The method according to claim 5, wherein said one or more amine components is a mixture comprising at least two of triethylene tetramine (TETA), a tetraethylene pentamine (TEPA), pentaethylene hexamine (PEHA), hexaethylene heptamine, a heptaethylene octamine (HEOA) and octaethylene nonamine.

9. The method according to claim 1, wherein the treating agent is added in amount from 0.01% w to 2.5% w calculated on the total weight of the reaction mixture.

10. The method according to claim 5, wherein the amount of the one or more amine components is from 0.01% w to 2.5% w calculated on the total weight of the reaction mixture.

11. The method of claim 1, wherein the radicals R$^4$, R$^5$, R$^6$, R$^7$ and R$^8$ are each independently selected from the group consisting of aliphatic hydrocarbons having 1 to 15 carbon atoms, which are substituted by an isocyanate-reactive group.

12. The method according to claim 11, characterized in that each the isocyanate-reactive group in R$^4$, R$^5$, R$^6$, R$^7$ and R$^8$ is an —OH, —NH— or —NH$_2$ group.

* * * * *